United States Patent [19]
Toda

[11] 4,313,744
[45] Feb. 2, 1982

[54] METHOD AND DEVICE FOR AUTOMATICALLY FUSING OPTICAL FIBERS

[75] Inventor: Yuichi Toda, Yokohama, Japan

[73] Assignee: Sumitomo Electric Industries, Ltd., Osaka, Japan

[21] Appl. No.: 139,522

[22] Filed: Apr. 11, 1980

[51] Int. Cl.³ .............................................. C03B 23/20
[52] U.S. Cl. ...................................... 65/4.21; 65/152; 350/96.21
[58] Field of Search ................... 65/4.21, 4.3, 12, 152; 156/158; 350/96.21

[56] References Cited

U.S. PATENT DOCUMENTS

| | | | |
|---|---|---|---|
| 3,960,531 | 6/1976 | Kohanzadeh et al. | 65/4.21 |
| 4,049,414 | 9/1977 | Smith | 65/4.21 |
| 4,118,618 | 10/1978 | Gauthier et al. | 65/4.21 X |
| 4,152,190 | 5/1979 | Kurosawa et al. | 156/158 |

OTHER PUBLICATIONS

Hatakeyama et al., "Fusion Splices for Optical Fibers . . ."; Applied Optics, vol. 17, No. 12, Jun. 1978, pp. 1959–1964.

*Primary Examiner*—Richard V. Fisher
*Attorney, Agent, or Firm*—Sughrue, Mion, Zinn, Macpeak & Seas

[57] ABSTRACT

A device and method for automatically fusing optical fibers by melting portions of the fibers by discharge heating. Two optical fibers to be joined are each held by a fiber supporting stand and fiber holding stand one said of which is movable along the axial direction of the fibers. The movable fiber holding stand is spring biased. Its various positions are determined by plural stops which may be retracted to allow the movable fiber holding stand to move under force of the spring. A micrometer head driven by an electric motor moves the movable fiber holding stand in the forward direction.

5 Claims, 2 Drawing Figures

METHOD AND DEVICE FOR AUTOMATICALLY FUSING OPTICAL FIBERS

BACKGROUND OF THE INVENTION

The present invention relates to a device for fusing optical fibers using an arc discharge.

A conventional automatic optical fiber fusing device will be described with reference to FIG. 1. In FIG. 1, reference numerals 1 and 1' designate optical fibers, 2 and 2' fiber supporting stands adapted to support optical fibers from the end portions of which the covers have been removed, 3 and 3' stands adapted to fix or hold the fibers through the covers, 4 a reference element for determining the initial distance between the ends of the fibers, 5 a compression spring, 6 a micrometer head, 7 and 7' gears, and 8 an electric motor.

In operation, first the fibers from the end portions of which the covers have been removed are placed on the fiber supporting stands 2 and 2' and are then slid axially until the ends of the fibers abut against the reference element 4. Thereafter, the optical fibers are attached through the covers to the holding stands 3 and 3'. The electrodes used for creating the arc discharge for fusing the optical fibers are not shown in FIG. 1. However, the electrodes are fixedly secured perpendicularly to the plane of the drawing with the axes of the electrodes extending through the intersections of the line 19, that is, the left-hand surface of the stop 4, and the axes of the fibers 1 and 1'.

Upon depression of a drive start button (not shown), the reference element 4 is automatically retracted downwardly and the motor 8 is started. The rotation of the motor 8 is transmitted through the gears 7' and 7 to the micrometer head 6 rotating the micrometer head 6. The direction of rotation of the motor is chosen so that the end of the micrometer head 6 is moved backwardly. Therefore, the fixing stand 3' is moved forwardly on a sliding rail (not shown) urged by the force of the spring 5.

Simultaneously upon the start of the motor rotation, a timer is operated to effect an electrode discharge for a period of time $T_1$ which is defined by the following equation:

$$l - VT_1 = \alpha,$$

where $l$ is the width of the stop, V is the speed of the end of the fiber which is moved by the rotation of the motor, and $\alpha = 10$ to $50$ $\mu$m. After the discharge has been started, the fiber is continuously moved forwardly. However, it is stopped a period of time $T_2$ after the discharge was started. The period of time $T_2$ is defined by the following equation:

$$VT_2 = \alpha - \epsilon$$

where $\epsilon = -5$ to $-50$ $\mu$m. The discharge is stopped a period of time $T_3$ after it was started. At this instant, connection of the fibers has been completed. After the discharge has been stopped, the fibers thus connected are removed from the device. Thereafter, a reset button (not shown) is depressed as a result of which the motor 8 is rotated in the opposite direction and, after a period of time $T_4$ defined by the following equation, the motor 8 is stopped:

$$VT_4 = l - \epsilon$$

As is clear from the above description, in the conventional technique, the speed of revolution of the motor is maintained constant to fix the above-described periods of times thereby to determine the position of the fiber. However, the conventional technique is disadvantageous in the following points. If the speed of the motor should in fact change, the fiber will be positioned inaccurately. In addition, variations in the positioning the fiber may be caused by the variations in the output of the timer.

Accordingly, an object of the invention is to eliminate the above-described difficulties accompanying the conventional technique. More specifically, an object of the invention is to position the ends of fibers with high accuracy so that the fibers can be fused together with low loss.

SUMMARY OF THE INVENTION

Accordingly, these and other objects of the invention are met by an automatic optical fiber fusing device for joining optical fibers by melting portions of the fibers by arc discharge heating including fiber supporting stands for vertically supporting optical fibers, a reference element disposed between ends of fibers held by the fiber supporting stands, fiber holding stands which hold the optical fibers such as through a casing thereof and capable of moving at least one of the optical fibers along its axial direction, a spring, one of the fiber holding stands being movable in the axial direction of the fibers by means of the spring, an electric motor, a micrometer head with the movable fiber fixing stand being movable forwardly and backwardly at a desired speed with the aid of the elastic force of the spring by the micrometer head which is moved by the electric motor, a plurality of stops for stopping the movable stand at predetermined positions, a discharge heat source, the reference element, the stops, the micrometer head and the heat source being driven according to a preset sequence to successively move the end of the optical fiber held by the fiber fixing stand to positions determined by the positions of said stops thereby to fuse the ends of the optical fibers.

Yet further in accordance with these and other objects of the invention there is provided a method for fusing optical fibers in which optical fibers are held by fiber supporting stands and fiber holding stands one of which is movable and initially retained by lock means with the ends of the optical fibers held in abutment with both sides of the reference element including the steps of retracting the reference element, releasing the lock means to allow the movable fiber holding stand to move to a micrometer head, operating an electric motor to move the micrometer head backwardly to move the movable fiber holding stand to a position in abutment with a first stop, retracting the first stop, starting a discharge heat source a predetermined period of time after retracting the first stop, moving the micrometer head further backwardly to allow the movable fiber holding stand to move forwardly to a position in abutment with a second stop, stopping the discharge heat source, and returning the movable fiber holding stand, the reference element, the first stop and the micrometer head to initial positions thereof. In a modification of this method, the first stop may be eliminated and the position of the micrometer head otherwise stopped at an equivalent position. In yet a further modification the method of the invention, each of these stops may be eliminated and the electric motor replaced by a pulse motor with the positions of the micrometer head defined by rotational positional angles of the pulse motor.

DESCRIPTION OF THE PREFERRED EMBODIMENTS

In a first preferred embodiment of an automatic optical fiber fusing device according to the invention which fulfills these and other objects of the invention, instead of the above-described motor, a pulse motor is employed to accurately provide the necessary amounts of rotation or the necessary rotational angle. Accordingly, it is unnecessary to use a timer or the like. The fiber positioning can be achieved with a high accuracy, typically within 1 μm.

Figure 1:
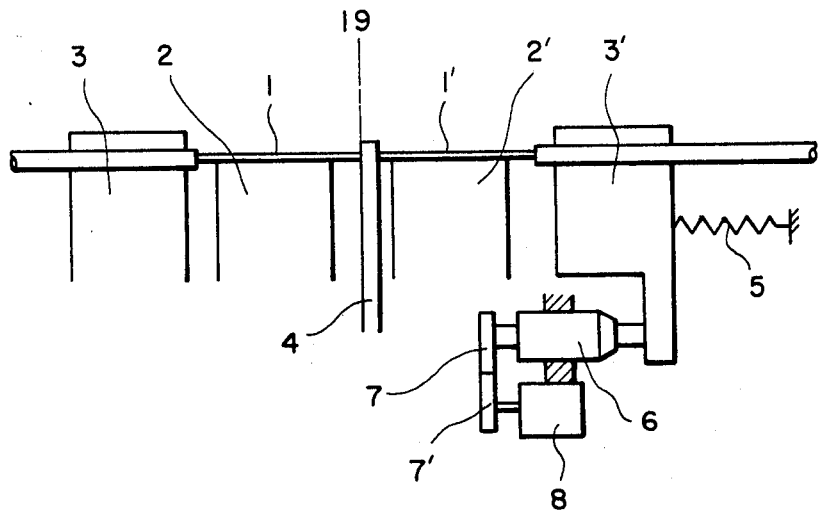
FIG. 1 is an explanatory diagram showing a conventional automatic optical fiber fusing device.
Figure 2:
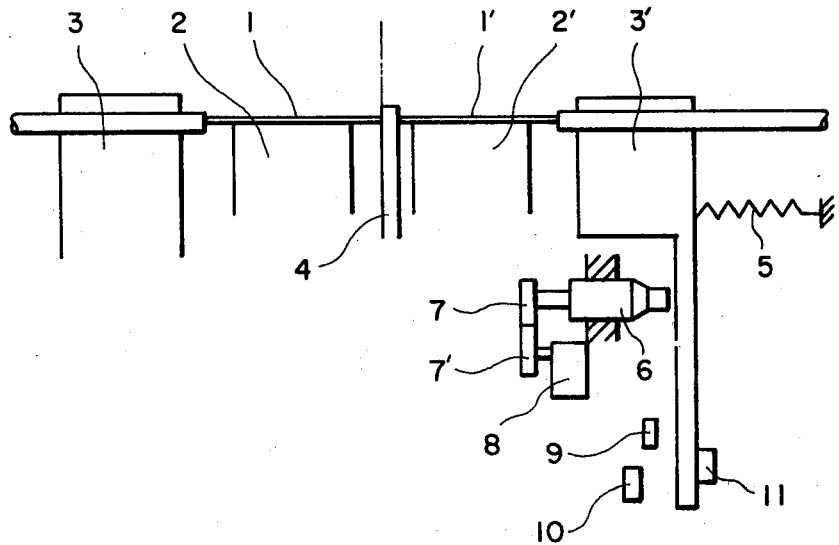
FIG. 2 is an explanatory diagram showing a preferred embodiment of an automatic optical fiber fusing device according to the invention.

A second preferred embodiment of the automatic optical fiber fusing device according to the invention is shown in FIG. 2 where like reference numerals designate similar components to those of FIG. 1. In this example, additional reference elements 9, 10 and 11 are employed. A fiber holding stand 3' is secured to a reference element 4 through a link mechanism (not shown).

In an initial state with the reference element 4 maintained in the upwardly protruding position shown in FIG. 2, the fiber holding stand 3' is secured to the stop 11 by a lock mechanism. When the reference element 4 is retracted, the lock mechanism is released as a result of which the fiber fixing stand 3' comes into abutment with the micrometer head 6. As the micrometer head 6 is retracted upon rotation of the motor 8, the fiber fixing stand 3' is moved into abutment with the stop 9 and is held thereby while the end of the micrometer head 6 continues to move until it is stopped at a distance of 5 or 6 μm from the stop 9. At this time instant, with the distance between the ends of the fibers 1 and 1' at α as described, the discharge is started.

Following this, the stop 9 is retracted perpendicularly to the plane of the drawing to a position where the movement of the fiber holding stand 3' is not obstructed thereby. The holding stand 3' is then moved forwardly 5 or 6 μm by the force of the spring 5 until it abuts against the end of the micrometer head 6. While the stop 9 is being moved, the micrometer head 6 is also moved. Therefore, the fiber holding stand 3' moves forwardly following the micrometer head 6 until it abuts against the stop 10 and is stopped thereby. In this case, the distance between the ends of the fibers is reduced to ε. At this point, the motor is stopped by means of a timer or a limit switch (not shown). It should be noted that, when the motor is stopped, the micrometer head 6 has been retracted to a position where the fiber holding stand 3' can be brought into contact with the stop 10.

Then, the fibers are removed from the device and the motor is rotated in the opposite direction by depressing a reset button (not shown). As a result, the micrometer head 6 is moved forwardly, the stop 9 is moved upwardly, and the fiber holding stand 3' is moved backwardly through the link mechanism until it abuts against the stop 11 and is locked thereto.

As is clear from the above description, the function of the micrometer head is to maintain constant the speed of movement of the fiber. It does not determine the positioning of the fiber.

If the position where the fiber fixing stand 3' abuts the micrometer head 6 when the lock is released is at the position of the stop 9, then the stop 9 can be eliminated. That is, the arrangement of the device can be simplified although in this case the accuracy of positioning of fiber is lowered to some extent. However, this modification can be usefully employed if fluctuations in discharge time can be tolerated to some extent. This modification moreover contributes to reducing the size of the overall device.

As is apparent from the above description, according to the invention, the determination of the positions of optical fibers for fusing the fibers together is readily achieved with high accuracy. Therefore, optical fibers can be fused together with high stability and low loss.

What is claimed is:

1. An automatic optical fiber fusing device for joining optical fibers by melting portions of the fibers by arc discharge, comprising: at least two fiber supporting stands for supporting said optical fibers; a reference element; at least two fiber holding stands for holding said optical fibers disposed on both sides of said reference element; a spring having an elastic force, said first fiber holding stand being movable in an axial direction of said fibers by means of said spring; an electric motor; a micrometer head; said first fiber holding stand being moved forwardly or backwardly at a desired speed with the aid of said elastic force of said spring by said micrometer head moved by said electric motor; a plurality of stops for stopping said first fiber holding stand at predetermined positions; means for heating; said reference element, said stops, said micrometer head and said means for heating being driven according to a preset sequence to successively move an end of a first optical fiber held by said first fiber holding stand to said predetermined positions and to fuse the ends of said optical fibers.

2. The device as claimed in claim 1 wherein said reference element and one of said stops is movable in a second direction.

3. A method for fusing optical fibers in which optical fibers are held by fiber supporting stands and fiber holding stands, one fiber holding stand being movable and initially retained by lock means, the ends of said optical fibers initially held in abutment with both sides of a reference element, comprising the steps of: retracting said reference element; releasing said lock means to allow said movable fiber holding stand to move to a micrometer head; operating an electric motor to move said micrometer head backwardly to allow said movable fiber holding stand to move forwardly to a position in abutment with a first stop; retracting said first stop; starting a discharge heat source a predetermined period of time after retracting said first stop; moving said micrometer head further backwardly to allow said movable fiber holding stand to move forwardly to a second position in abutment with a second stop; stopping said discharge heat source; and returning said movable fiber holding stand, said reference element, said first stop and said micrometer head to their initial positions.

4. A method for fusing optical fibers in which optical fibers are held by fiber supporting stands and fiber holding stands, one fiber holding stand being movable and initially retained by lock means, the ends of said optical fibers initially held in abutment with both sides of a reference element, comprising the steps of: retracting said reference element, releasing said lock means to allow said movable fiber holding stand to move to a micrometer head; operating an electric motor to move said micrometer head backwardly to allow said movable fiber holding stand to move forwardly to a first predetermined position; starting a discharge heat source a predetermined period of time after said movable fiber holding stand has reached said first predetermined position; moving said micrometer head further backwardly to allow said movable fiber holding stand to move forwardly to a second predetermined position in abutment with a stop at said second predetermined position; stopping said discharge heat source; and returning said movable fiber holding stand, said reference element and said micrometer head to their initial positions.

5. A method for fusing optical fibers in which optical fibers are held by fiber supporting stands and fiber holding stands, one of said fiber holding stands being movable, the ends of said optical fibers initially held in abutment with both sides of a reference element, comprising the steps of: retracting said reference element; operating a pulse motor to move a micrometer head backwardly to allow said movable fiber holding stand to move to a first predetermined position; starting a discharge heat source a predetermined period of time after said movable fiber holding stand has reached said first predetermined position; moving said micrometer head further backwardly by operation of said pulse motor to allow said movable fiber holding stand to move forwardly to a second predetermined position; stopping said discharge heat source; and returning said movable fiber holding stand, said reference element and said micrometer head to their initial positions.

* * * * *